Jan. 2, 1934.  E. GETAZ  1,942,330
AUTOMATIC COIN OPERATED LIQUID MEASURING AND DISPENSING DEVICE
Filed Dec. 15, 1931  3 Sheets-Sheet 1
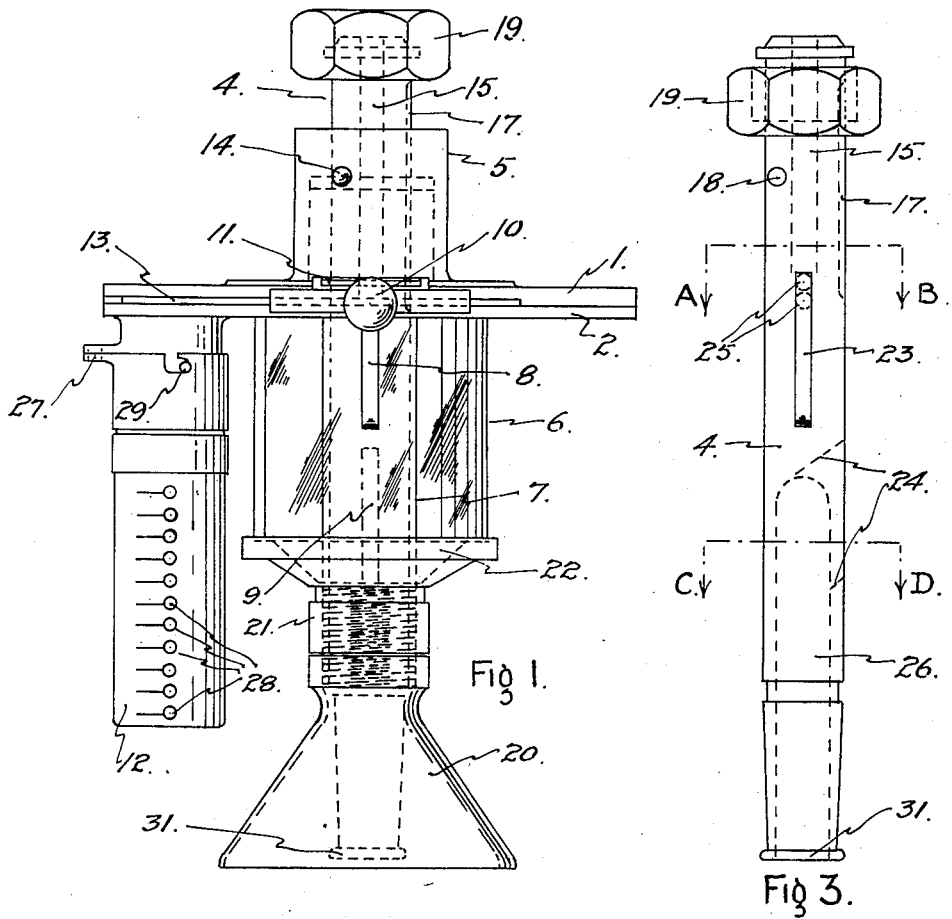
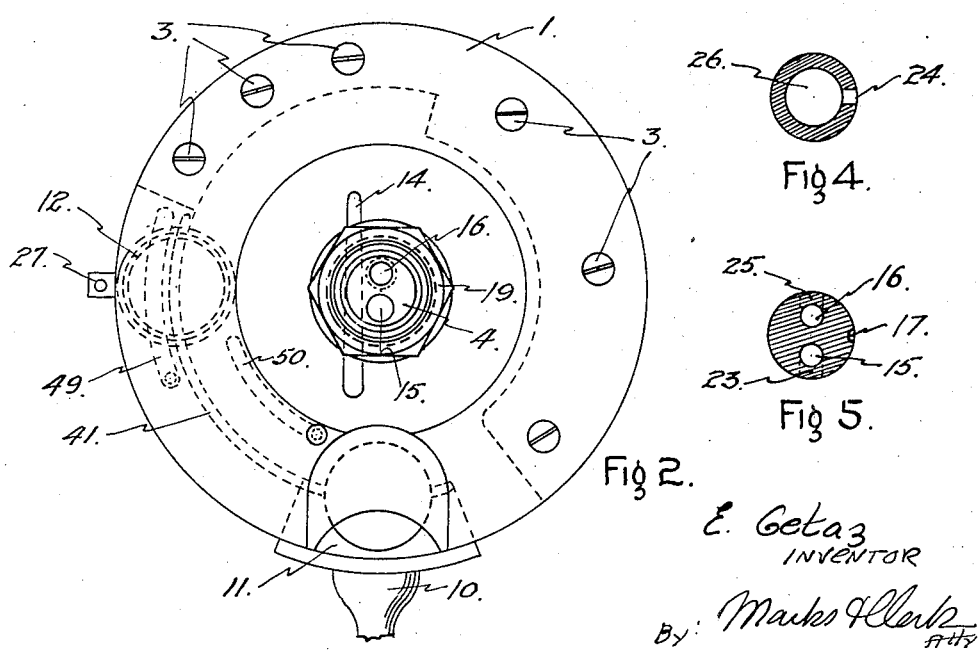
E. Getaz
INVENTOR
By: Marks & Clerk
Attys Jan. 2, 1934.   E. GETAZ   1,942,330
AUTOMATIC COIN OPERATED LIQUID MEASURING AND DISPENSING DEVICE
Filed Dec. 15, 1931   3 Sheets-Sheet 2
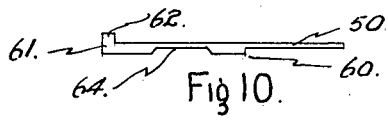
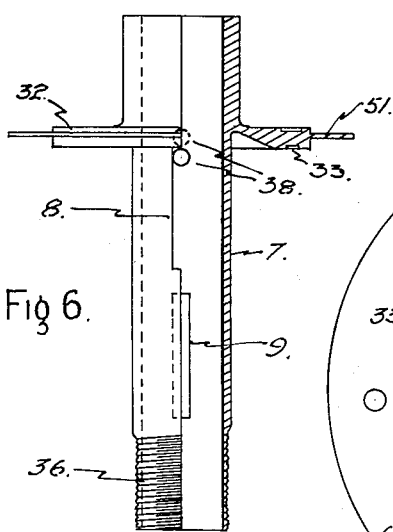
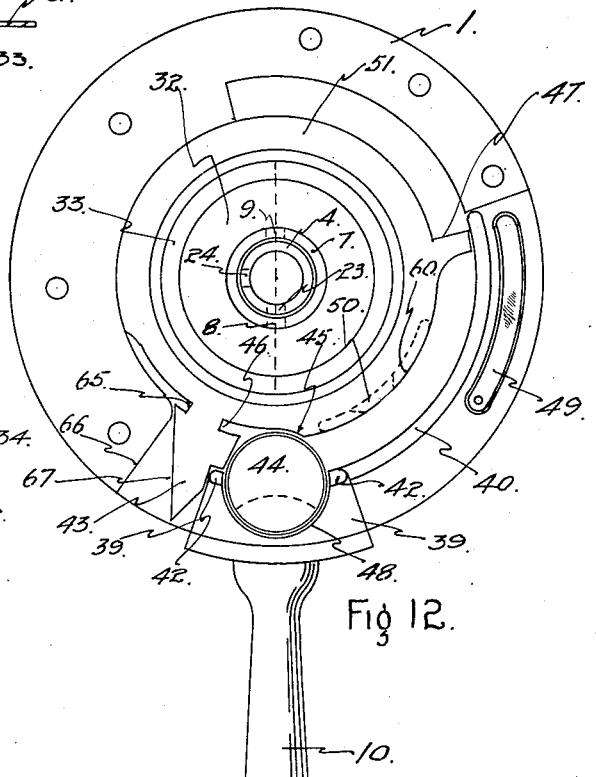
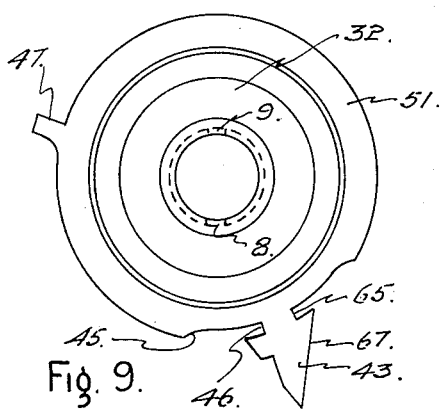
E. Getaz
INVENTOR
By: Marks & Clerk
ATTYS.

Jan. 2, 1934.  E. GETAZ  1,942,330
AUTOMATIC COIN OPERATED LIQUID MEASURING AND DISPENSING DEVICE
Filed Dec. 15, 1931  3 Sheets-Sheet 3
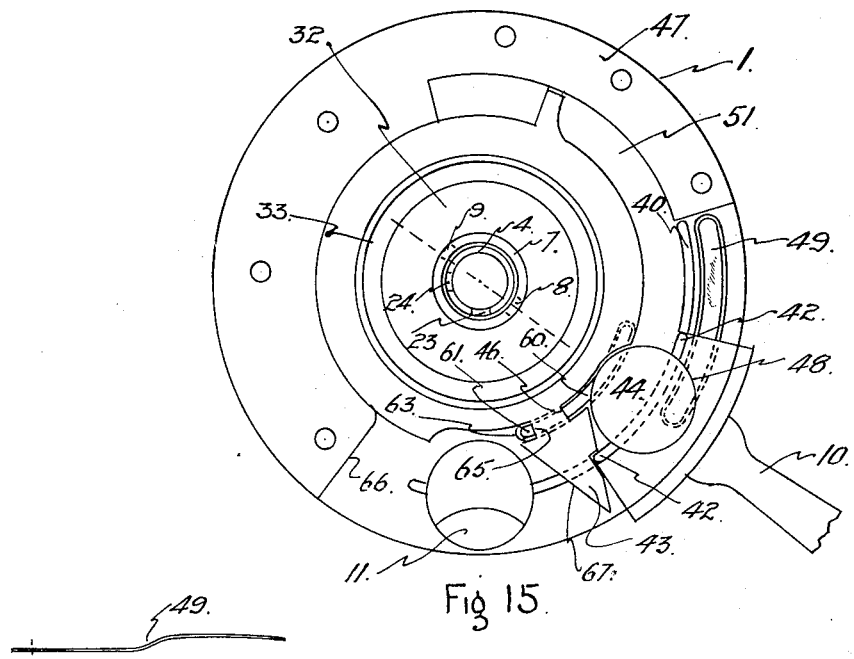
Fig 15.
Fig 14.
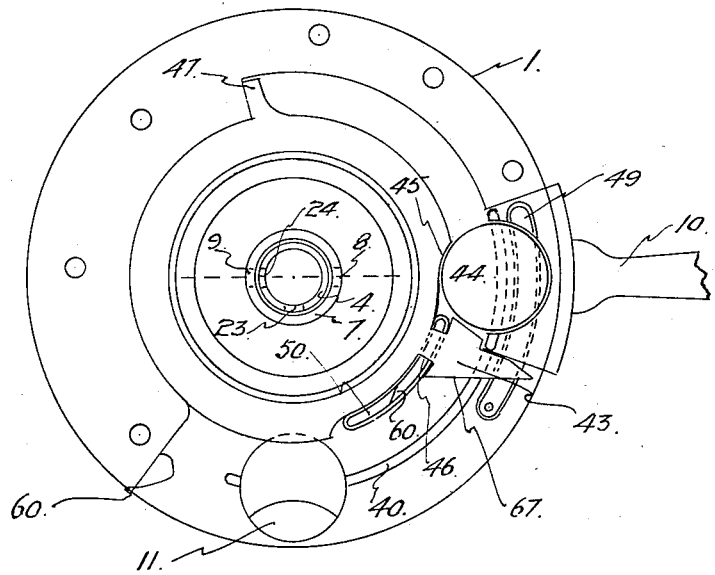
Fig 16.
E. Getaz
INVENTOR
By Marks & Clark
Attys.

Patented Jan. 2, 1934

1,942,330

UNITED STATES PATENT OFFICE 1,942,330

AUTOMATIC COIN-OPERATED LIQUID MEASURING AND DISPENSING DEVICE

Emile Getaz, Durban, Union of South Africa, assignor to Automatic Fluid Distributing Company (Proprietary) Limited, Durban, Natal, South Africa Application December 15, 1931, Serial No. 581,236, and in the Union of South Africa September 18, 1931

15 Claims. (Cl. 194—66)

This invention relates to a device for measuring and dispensing liquids in measured quantities and may be of the coin operated type whereby payment must be made by the insertion of the correct coin or coins in the coin slot before the measured quantity of liquid may be drawn off by the customer.

It is known that various types of coin-freed machines are at present in use whereby measured quantities of a liquid may be drawn off by the insertion of a coin. These however are mostly of a complicated and cumbersome nature as well as being difficult of access for cleaning purposes.

The improved device herein described is constructed with a minimum of working parts and is so designed that it may be quickly and easily dismantled for purposes of cleaning. This feature assumes very definite importance when the device is used for dispensing a perishable liquid such as milk, where the use of hygienic apparatus for its handling is imperative for reasons of health. This invention is particularly adapted for the dispensing of milk in measured quantities although it may also be used for other liquids.

The improved device being light and compact is arranged to be attached, by screwed or other means, to the milk cans or containers as they are delivered, and the whole may then be mounted in a suitable frame or stand ready for use.

In construction the machine comprises a vertically disposed slotted sleeve rotatable about a fixed plug member in which suitably positioned slotted ports coincide alternatively with slotted ports in the sleeve when said sleeve is partially rotated by a handle. The measuring vessel preferably of glass surrounds the sleeve concentrically and is clamped in place by means screwing onto the lower end of said sleeve. The upper portion of the sleeve has formed on it an integral flanged portion which is rotatably held between two larger flanges. The operating handle slides in a part circular slot or slit between said flanges. The inner end of the handle is formed in the shape of a fork the extremities of which are provided with projections which engage in part circular slots in the aforesaid top and bottom flanges. A coin placed in said fork at the same time engages with a part circular notch on the integral flanged portion of the sleeve member causing it to rotate with the handle until brought opposite an aperture in the bottom flange leading to the coin container, into which the coin is ejected by means of a spring. In this position one set of slotted ports in the sleeve and plug member of the device register with one another and allow the liquid contents of the measuring vessel to be discharged through a central hole in said plug member communicating with one slotted port therein.

To allow air to enter the can to replace the liquid drawn off, an air vent tube screwed into the top end of the plug member projects into the said can, while the hole into which it is screwed communicates by a passage with vents opening into the measuring vessel. A further groove in said plug member registers with said vents when the sleeve is turned to a position allowing the liquid to be drawn off from the measuring vessel. In this manner air locks in the apparatus are conveniently avoided.

Stop means are provided to prevent the device being fraudulently operated without the insertion of the required denomination of coin. A suitable bell-mounted guard is provided round the discharge aperture to protect it from damage and contamination by dust and dirt.

To enable the invention to be more readily understood and carried into practice, reference will now be made to the accompanying sheets of drawings showing a preferred embodiment of the invention in which all references throughout all views refer to the same parts.

In the drawings:—

Fig. 1 represents an elevation of the complete apparatus.

Fig. 2 is a plan view on Fig. 1.

Fig. 3 is an elevation of the fixed plug member.

Fig. 4 is a section on line AB in Fig. 3.

Fig. 5 is a section on line CD in Fig. 3.

Fig. 6 is a part sectional elevation of the movable sleeve member.

Fig. 7 is a part sectional elevation of the coned bottom of the measuring vessel.

Fig. 8 is a part sectional elevation of the clamping nut for same.

Fig. 9 is a plan view on Fig. 6.

Fig. 10 is an elevation of the locking stop.

Fig. 11 is an under plan on Fig. 10.

Fig. 12 is an under plan view of the device with bottom flange ring, measuring vessel, clamping means, and bell mouthed guard removed to show coin operated mechanism at commencing position of the operating handle.

Fig. 13 is an end elevation of the operating handle.

Fig. 14 is a side elevation of coin releasing spring.

Fig. 15 is a plan view similar to Fig. 12 but with handle in mid position.

Fig. 16 is a plan view similar to Fig. 12 but with handle in its extreme position in line with coin box aperture.

Referring to the drawings 1 denotes the top flange with which is integrally formed the boss 5. A bottom flange or ring member 2 carrying the coin box 12 is attached to the top flange 1 by countersunk screws 3. Passing through the boss 5 and secured thereto by the taper pin 14 is the plug member 4 whose upper end is adapted to be connected to a screwed nipple on the can or container by means of the collared nut 19.

A sleeve member 7 whose bottom end 36 is screwed, is provided with a flange portion 32 and is a good sliding fit on said plug member 4, and is further provided with slotted ports 8 and 9 on opposite sides thereof and on different horizontal planes. The measuring vessel is composed of an open ended cylindrical section of glass 6 which is clamped between the under side of flange portion 32 and the coned washer 22, which forms the bottom of said vessel. Circular recesses 33 and 34 in flange portion 32 and washer 22 are provided with rubber packing rings, to enable liquid tight joints to be made by means of the clamping unit 21 which screws onto the screwed end 36 of the moveable sleeve 7.

The clamping nut 21 is machined with a recessed spigot 35 on its upper end. A rubber or other packing ring is placed in said recess and in co-operation with the recess 37 in the bottom of the washer 22, forms a liquid tight joint between said washer and the sleeve 7. A bell-mouthed guard 20 protecting the discharge spout 31 likewise screws onto the screwed end 36 of the sleeve 7.

From the description it will be seen that the cylindrical glass section 6, the washer 22, clamping nut 21, and the bell-mouthed guard 20 are all secured to the sleeve 7 and will revolve with it when the device is operated by the handle 10 in a manner to be described.

In Fig. 3 the plug 4 is shown in the same position and to the same scale as it appears in Fig. 1. The tapered hole 18 when the device is assembled, registers with coinciding tapered holes in the boss 5 and the insertion of the taper pin 14 secures the two portions firmly together. A slotted port 23 equal in length and width to the slotted port 8 in the sleeve 7 communicates with a bore 15 and provides the passage through which the milk flows out of the can into the measuring vessel. At right angles to slotted port 23 and on the plane corresponding to the position of the slotted port 9 in the sleeve 7, is a further slotted port 24 communicating with a bore 26 which terminates in the spout 31. The lower edge of said slotted port 24 is on a level with the lowest point of the coned inner face of the washer 22 and thus provides the outlet aperture through which the measured quantity of milk discharges from the measuring vessel into a container held beneath the spout 31. It will be evident that the position of the sleeve 7 in relation to the plug 4 determines which slotted ports will register with one another. It will also be clear that at no time can the slotted port 23 discharging from the can or container, be in direct communication with the slotted port 24 discharging from the measuring vessel.

Directly opposite the top end of slotted port 23 are holes 25 communicating with a bore 16 whose upper end is tapped to received a vent pipe which projects into the can and allows air to take the place of the disposed liquid and prevent an air lock. In the position of the sleeve 7 shown in Fig. 1 slotted ports 23 and 8 are registering with one another, while the air vents 25 on the plug 4 are registering with the further set of air vents 38 in the sleeve 7. In this position milk will flow into the measuring glass 6 by way of the bore 15 and slotted ports 23 and 8, while air thus displaced from said measuring glass 6 will enter the can by way of air vents 38 and 25, bore 16 and the vent pipe screwed therein. When the sleeve 7, by means of the operating handle 10, is rotated from its position in Fig. 1 90 degrees to the left, the slotted port 9 therein will register with the slotted port 24 in the fixed plug 4. By the same movement slotted ports 8 and 23 will no longer register, and communication from the can to the measuring glass 6, will be cut off. At the same time the air vents 38 in the sleeve 7 will register with the lower end of the groove 17 on the plug 4 enabling air to enter the glass 6 as the milk contained therein discharges from the spout 31. In this manner air locks are entirely eliminated.

The coin box 12 is shown attached to an extension of the flange ring 2 by means of a bayonet joint 29 while the holed projections 27 enable the box to be locked or sealed, in position against unauthorized detachment. The series of inspection holes 28 enable the number of coins in the box to be computed without detaching same. To facilitate this operation, marks may be provided opposite each inspection hole and these numbered to correspond to the number of coins in the box which would reach the level of each respective mark. The coin box may be of any length and of any convenient size. In a modification of the invention the coin box may be separate from the machine and a coin chute provided to deliver coins from the machine to said coin box. The coin slot where the coins are inserted is shown at 11 and is preferably at right angles to the coin box 12, as clearly shown in Fig. 2. A part circular slit 13 between the top and bottom flanges 1 and 2 allows for a 90 degree rotational movement of the operative handle 10, whose thin fork like extremities 39 (Figs. 12 and 13) are a sliding fit in said slit 13. Coinciding part circular grooves 40 and 41 are provided in the top and bottom flanges 1 and 2 with which projections 42 on the forked extremities 39, slidably engage and thus retain the handle 10 in its sliding operable position.

The coin operated mechanism will now be described and reference is made to Figs. 12, 15 and 16 which are under plan views of the machine showing the interior working parts in three positions of the operating handle 10.

Fig. 12 shows the position of the parts as depicted in Fig. 1. It will be seen that a triangular projection 43 on the reduced flanged portion 32 of the sleeve 7 is to the left of the handle 10. A coin 44 is shown in its position when inserted in the coin slot 11. The part-circular space 48 in the handle 10 is such that it will just fit the outside circumference of the size of coin for which the machine is designed, while the thickness of the portions 39 will be slightly greater than the maximum thickness of the said coin. On the reduced portion 51 of the flange 32 is arranged a part circular niche or notch 45 in such a position and of such contour that the coin 44 when inserted in the slot and filling the space 48 also registers with the notch 45. When therefore the handle 10 is moved in an anticlockwise direction, with respect to Fig. 12, the flanged portion 32 of the sleeve 7 will, owing to the coin 44, be caused to rotate with said handle. If the rotation of the handle 10 is continued until it reaches the end of the slit 13, a flat spring 49 will eject the coin from the space 48 into the coin box 12 whose top opening in this position of the handle 10, will exactly coincide with the part circular space 48. A stop 47 also serves to limit the rotational movement of the flange 32.

In Fig. 15 the operating handle 10 is shown in its midway position when none of the slotted ports in the sleeve and plug member register with one another. Fitted loosely in a semicircular slot 63 is the part circular stop member 50 as detailed in Figs. 10 and 11. The boss 62 is located loosely in a hole in the flange 1 while the remainder lies in the said slot 63. It will be noted that a depression 64 is machined in its underside and further metal removed from its end, leaves a cross ridge or projection 60 at an angle to the stop itself. The stop operates by gravity but spring means may be inserted behind it if required.

In the position of the handle 10 shown in Fig. 15 the edge of the coin 44 has just passed the ridge or projection 60. It will be noted that the narrow neck portion of the projection 43 coincides with the depression 64, and the whole stop member 50 will tend to drop by gravity until the bottom of the depression 64 meets the neck of the projection 43. The projection 60 will likewise drop and if an attempt is made to rotate the handle 10 in a backward direction, the edge of the coin 44 will engage with the projection or ridge 60 and such reverse movement will be prevented. This action of the stop 50 frustrates any attempt to use the machine fraudulently by securing the return of the coin after the measured quantity of milk has been withdrawn. As soon as the handle is moved to the limit of its travel the coin 44 will of course be ejected by the spring 49 into the coin box 12, and the handle is then free to be returned to its starting position.

The stop member 50 fulfils a further purpose. It might happen that dishonest persons desiring to operate the machine without payment might conceive the idea of rotating the sleeve 7 by grasping the guard 20 and rotating it together with the said sleeve 7. Such persons will however only be able to rotate said sleeve until the end of the slot 46 on the neck portion of the projection 43 comes in contact with the end 61 of the stop member 50. This movement will be insufficient to bring the slotted ports 24 and 9 into registered alignment and such fraudulent attempt to obtain goods without payment will likewise be completely frustrated. The under surface of the slot end 65 will be slightly bevelled so that in the return movement of the handle 10 after the coin has been deposited in the coin box 12, the triangular projection 43 will pass freely over the ridge or projection 60.

In Fig. 16 the handle 10 is shown in its extreme position where the space 48 coincides with the top opening for the coin box 12 and the coin 44 is in a position to be ejected into it by the flat spring 49. In this position the slotted ports 9 and 24 register with one another and the milk is free to run out of the measuring glass 6 via the bore 26 and spout 31. If more than one coin is placed in the coin slot only the bottom one will be taken and on the return movement of the handle 10 the surplus coin or coins will be ejected through the slit 13 by the converging faces 66 and 67 of slit end and triangular projection 43.

When the machine is operated in the normal manner by a coin the inner edge of said coin prevents the end 61 of the stop member 50 from engaging with the slot end 46. A coin of the correct size and thickness must therefore be inserted in the machine to cause same to operate.

The inner face of the clamping washer will preferably be coned in such a manner that the lowest point of said coned face will be opposite the lower end of discharge port 9. In this manner the last drop of liquid will discharge from the measuring vessel and the customer will obtain the full quantity paid for.

What I claim is:—

1. An automatic coin operated liquid dispensing and measuring device comprising a ported plug member attachable by its upper end to a liquid container, a flanged member detachably fixed to said plug member adjacent its upper end, a ported sleeve member having an integrally formed flange partially rotatable on said plug member, a ring flange secured to said flanged member and rotatably locating the said integrally formed flange on said sleeve between its inner face and a part circular recess in said flanged member, a cylindrical sectioned measuring vessel concentrically surrounding said sleeve member and clamped between a circular recess in the under face of the integrally formed flange on the aforesaid sleeve member, and a similar recess in a washer threaded over the bottom end of the sleeve member and secured by a clamping nut screwed to the bottom end thereof, a bell mouthed guard likewise screwed to the bottom end of the sleeve member and surrounding the bottom spouted end of said plug member, a handle partially rotatable in an arcuate slit between the flange members, the inner end of said handle being of part circular shape to receive a coin to form the connecting means between said handle and said integral flange.

2. An automatic coin-operated liquid dispensing and measuring device as claimed in claim 1 wherein the plug member is provided with one slotted port communicating with a bore making exit at the upper end thereof, while a second slotted port on a lower plane and at right angles to the first mentioned slotted port, communicates with a bore making exit at the bottom spouted end thereof, and wherein air vents opposite the top end of the first mentioned slotted port communicate with a second bore likewise making exit at the upper end of said plug member which is tapped at said exit end to receive an air vent tube.

3. A coin-operated liquid dispensing and measuring device as claimed in claim 1, wherein said plug member is provided with an upper slotted port communicating with a bore making exit at the upper end thereof, while a second slotted port on a lower plane and at right angles to said first mentioned slotted port, communicates with a bore making exit at the bottom spouted end thereof, and wherein a vertical air vent groove communicating to atmosphere is provided in its outer surface adjacent its upper end vertically in line with said lower slotted port and has its lower end terminating on the same horizontal plane as the top end of said upper slotted port.

4. A device as claimed in claim 1 wherein the integrally flanged sleeve member is a good sliding fit on said plug member and is provided with one slotted port adjacent the underside of the flanged portion, while a second slotted port on a lower plane and diametrically opposite said first mentioned port, is arranged in such a position that its lowest end coincides with the lowest inner point of the recessed washer clamping the cylindrical section measuring vessel, and wherein air vents opposite the top end of said first mentioned slotted port are on the same horizontal plane as the air vents in said plug member.

5. A device as claimed in claim 1, wherein a pair of co-operating slotted ports in the plug and sleeve located on a level with the upper end of said measuring vessel, in one position of said sleeve, register with one another to allow admission of liquid from the container to the measuring vessel, and wherein a second pair of co-operating slotted ports in the plug and sleeve located on a level with the bottom of the said measuring vessel in another position of said sleeve register with one another to allow discharge of the liquid by way of said bottom spouted end.

6. A device as claimed in claim 1 wherein the plug member is detachably secured to a boss on the flanged member by means of a taper pin passing through both boss and plug member and wherein the upper end of said plug is secured to the liquid container by known means.

7. A device as claimed in claim 1 wherein a part circular slit is provided between the flanged member and the ring flange secured thereto, wherein the flat forked end of an operating handle is slidably retained therebetween by the sliding engagement of projections on said forked extremities of the handle with the coinciding semi-circular grooves or slots on the inner faces of said flanged member and ring flange.

8. A device as claimed in claim 1 wherein the outer edge of the integral flange on the sleeve member is reduced in thickness and at one point is provided with a substantially triangular shaped projection which projects into and is slidably rotatable in the part circular slit between the flanged member and the ring flange, and wherein a further projection remote from said triangular shaped projection forms a stop limiting the rotational movement of said sleeve member.

9. A device as claimed in claim 1, wherein a flat portion of the operating handle slidable in an arcuate slit between the flange members is substantially fork-shaped, having projections on its two extremities engaging slidably in arcuate grooves provided in the adjacent faces of the flange members, and wherein the space between the fork extremities is of part circular shape to coincide with the curvature of the periphery of the denomination of coin arranged to operate the machine.

10. A device as claimed in claim 1 wherein the operating handle is adapted to receive a coin when a part circular space in it is in a position to coincide with a coin slot or aperture on the flanged member, in which position the triangular shaped projection of the integral flange will be on the rearward side of the operating handle in relation to its part rotational movement and wherein the inner edge of the coin will register with a shallow part circular notch in the reduced portion of the integral flange of the sleeve, to form positive coupling means between the operating handle and the sleeve.

11. A device as claimed in claim 1, wherein the arcuate slit between the flange members is of such a length as to limit the sliding rotational movement of the handle therein to 90 degrees, and wherein the operating coin at the end of such travel is ejected downwards through an aperture in the ring flange into a coin box attached thereto by a flat spring arranged in a slot in the inner face of said flanged member.

12. A device as claimed in claim 1 wherein a gravity or spring controlled stop of semi-circular shape is arranged in a part circular slot in the inner face of the flanged member, the outer edge of which slot coincides with the outer edge of a reduced portion of the integrally formed flange on the sleeve member, the position of said stop being approximately midway between the two extreme positions of the operating handle.

13. A device as claimed in claim 1, wherein a gravity or spring controlled stop of arcuate shape is located in an arcuate slot in the inner face of the flanged member, approximately midway between the two extreme positions of the operating handle, the outer edge of which slot coincides with the outer edge of a reduced portion of the integral flange on the sleeve member, and wherein a projection on the under face of said stop is adapted to engage with the edge of an operating coin to prevent reverse movement of the operating handle after it has passed the mid point of its travel, which position coincides with the discharge of the contents from the measuring vessel.

14. A device as claimed in claim 1, wherein one end of a gravity or spring controlled stop of arcuate shape located in an arcuate slot in the inner face of the flanged member is adapted to engage against the end of a slot in the neck portion of a triangular projection of the integral flange in such a manner as to prevent sufficient rotation of said sleeve to cause discharge ports in the sleeve and plug member to register with one another, and allow discharge of the contents of the measuring vessel, when an attempt is made to operate the device fraudulently without insertion of the correct coin.

15. A device as claimed in claim 1, wherein a flat forked portion of the operating handle slidable in the arcuate slit between the flange members during its return movement to the starting position engages against and carries with it, a triangular projection on the integral flange of the sleeve whose sloping rear edge co-operates with the end of said arcuate slit to expel redundant coins inserted in a coin slit in the flanged member.

EMILE GETAZ.